US006907099B2

(12) United States Patent
Kling et al.

(10) Patent No.: US 6,907,099 B2
(45) Date of Patent: Jun. 14, 2005

(54) METHOD AND APPARATUS FOR COMPUTED TOMOGRAPHY IMAGING

(75) Inventors: Patrick J. Kling, Mentor, OH (US); Donald A. Hescht, Clinton, OH (US); Xiangyu Huang, Cleveland, OH (US); George M. Mitchkash, Sagamore Hills, OH (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 149 days.

(21) Appl. No.: 10/136,565

(22) Filed: May 1, 2002

(65) Prior Publication Data

US 2003/0206609 A1 Nov. 6, 2003

(51) Int. Cl.[7] .................................................. A61B 6/00
(52) U.S. Cl. .......................................... 378/4; 378/901
(58) Field of Search ............................ 378/4, 210, 901, 378/92, 98.8; 709/105; 703/11

(56) References Cited

U.S. PATENT DOCUMENTS 6,061,421 A * 5/2000 Hagiwara ....................... 378/4

FOREIGN PATENT DOCUMENTS

EP  0 412 657 A2  2/1991
EP  0412657 A2 *  7/1991

OTHER PUBLICATIONS

Sanz, et al., "Computing Projections of Digital Images in Image Processing Pipeline Architectures", IEEE Trans. On Acoustics, Speech, & Signal Processing, V. ASSP–35, No. 2, Feb. 1987.
Crosetto, "A Modular VME or IBM PC Based Data Acquisition System for Multi–Modality PET/CT Scanners of Different Sizes and Detector Types", Nucl. Science Symposium Conf. Record, 2000 IEEE Lyon, FR XP010556907.

* cited by examiner

Primary Examiner—David V. Bruce
Assistant Examiner—Hoon Song
(74) Attorney, Agent, or Firm—Fay, Sharpe, Fagan, Minnich & McKee

(57) ABSTRACT

A computed tomography (CT) imaging apparatus (40) includes a CT imaging scanner (42) that acquires projection data. Data acquisition electronics (90) communicate with the CT scanner (42), and an acquisition computer ($60_1$) receives the projection data via the data acquisition electronics (90). A communication network (70) communicates with the acquisition computer ($60_1$) and with at least one additional computer ($60_2$, $60_3$, $60_4$). The at least one additional computer ($60_2$, $60_3$, $60_4$) cooperates with the data acquisition computer ($60_1$) and the communication network (70) to define a computational pipeline (104) that reconstructs selected projection data into a selected image representation.

15 Claims, 4 Drawing Sheets

METHOD AND APPARATUS FOR COMPUTED TOMOGRAPHY IMAGING

BACKGROUND OF THE INVENTION

The present invention relates to the medical imaging arts. It particularly relates to computed tomography (CT) imaging employing a rotating x-ray source, and will be described with particular reference thereto. However, the invention will also find application in conjunction with other types of medical imaging including magnetic resonance imaging (MRI), positron emission tomography (PET), single photon emission computed tomography imaging (SPECT), diagnostic ultrasound imaging, and the like.

Computed tomography (CT) imaging has application in many areas involving non-invasive examination of internal features of a subject. For example, CT is applicable in security baggage examination as well as in medical imaging. In CT imaging, an x-ray source transmits a fan or cone of x-rays into an examination region. The x-rays along each ray or path through the subject are partially absorbed. Detectors arranged across the examination region from the x-ray source detect the x-rays after traversing each ray or path through the examination region. The detected x-ray intensity is characteristic of x-ray transmissiveness along the ray or, when subtracted from the pre-subject intensity is characteristic of the absorption experienced as the x-rays pass through the examination region along each ray. Each data line typically represents projection data along a fan shaped swath. Typically, the projection data is convolved and back-projected into an image representation, although other reconstruction techniques are also known.

A typical modern CT imaging scanner employs a rapidly rotating (e.g., 120 rpm) x-ray source that produces a spatially extended wedge-, fan-, cone- or otherwise-shaped x-ray beam. A two-dimensional array of x-ray detectors or a plurality of one-dimensional arrays are arranged to collect x-ray data in parallel across the area of the x-ray beam. In helical CT the x-ray source continuously rotates about the subject as the subject is simultaneously advanced through the CT examination area. The helical arrangement effectuates a helical x-ray source motion relative to the subject.

The combination of a rapid rotation rate of a spatially extended x-ray source, parallel detection across the extended x-ray beam area, and continuous helical data acquisition translates into a CT imaging scanner which generates vast quantities of projection data at tremendous data acquisition rates. Preferably, the projection data are similarly rapidly reconstructed into image representations so that the CT imaging occurs in a manner approximating real time imaging. However, past reconstruction methods and apparatuses have struggled to keep up with the data influx.

CT scanners typically include one or more racks of reconstruction hardware, each custom designed for a portion of the reconstruction process. For example, dedicated processors rebin data. One or more array processors convolve each data line with a convolution or filter function. Other dedicated hardware units backproject each filtered data line into an image memory. In spiral data reconstruction, additional hardware weights and combines longitudinally displaced but axially aligned data. Various other data manipulations are performed in other dedicated hardware components.

The reconstruction processing hardware pipeline paradigm has a number of disadvantages. It is relatively inflexible because the processing path is defined in hardware. Upgrading or expanding the reconstruction pipeline either to increase speed or to add additional capabilities requires replacement or addition of at least one hardware component. Development of new or improved pipeline features or capabilities is similarly hampered. New hardware must be configured to "fit into" the pipeline both physically (i.e., connectively) and logically (i.e., in terms of input/output data format).

Furthermore, the hardware pipeline paradigm does not readily support optimal allocation of reconstruction resources across imaging systems. Interconnection of reconstruction components of different CT imaging systems is difficult or impossible. A second CT imaging system would typically be unable to access or utilize the hardware pipeline associated with a first CT imaging scanner.

In typical CT operation, the actual scanning time is brief while considerable time is expended on performing alternative reconstructions focusing on various clinical aspects. Hence, for a CT facility having two CT scanners each having separate, independent reconstruction hardware, only about one-half of the total reconstruction processing capacity of the CT facility is typically exercised at any given time.

Yet another disadvantage of past methods and apparatus is that alternative reconstruction algorithms often need additional or different dedicated hardware in the reconstruction pipeline. When a doctor or other medical analyst wants to perform an alternative or partial reconstruction of medical CT imaging data, for example to focus in on a clinically significant image feature, the doctor or analyst implements the selected post-processing reconstruction using the same reconstruction pipeline. During this post-processing, operation of the CT imaging system is suspended. Furthermore, if the doctor's non-standard reconstruction requires alternative or additional hardware, the pipeline must be reconfigured appropriately. Conversely, if the scanner is in use for imaging, the reconstruction pipeline is unavailable to other medical personnel.

The present invention contemplates an improved apparatus and method which overcomes the aforementioned limitations and others.

SUMMARY OF THE INVENTION

According to one aspect of the invention, a CT imaging apparatus includes a first CT gantry that acquires projection data. First dedicated data acquisition electronics communicate with the first CT gantry, and a first acquisition computer receives projection data from the first data acquisition electronics. A communication network communicates with the first acquisition computer. At least one additional computer communicates with the communication network. The at least one additional computer cooperates with the first data acquisition computer and the communication network to define a computational pipeline to perform reconstruction operations on the projection data received by the first acquisition computer.

According to another aspect of the invention, a modular system is disclosed for reconstructing diagnostic images. The modular system includes a high speed communications bus, a plurality of processing PC's connected with the bus, a first gantry for acquiring electronic data indicative of an internal region of a subject, and a first acquisition PC connected to the first gantry and the bus. The first acquisition PC is programmed to (1) control the first gantry, (2) acquire the electronic data from the first gantry, (3) perform limited processing of the electronic data, (4) distribute at least some of the electronic data to processing PC's, and (5) communicate with the processing PC's to cooperatively perform reconstruction operations on the data to generate image representations. A first non-volatile memory is connected with the first acquisition PC for storing the electronic data from the first gantry. The modular system also includes a second gantry for acquiring electronic data indicative of an internal region of a subject, and a second acquisition PC connected to the second gantry and the bus. The second acquisition PC is programmed to (1) control the second gantry, (2) acquire the electronic data from the second gantry, (3) perform limited processing of the electronic data, (4) distribute at least some of the electronic data to the processing PC's, and (5) communicate with the processing PC's to cooperatively perform reconstruction operations on the data to generate image representations. A second non-volatile memory is connected with the second acquisition PC for storing the electronic data from the second gantry. At least one display terminal is provided for converting electronic image representations reconstructed from the electronic data from the first and second gantries into a human viewable display.

According to yet another aspect of the invention, a method is provided for reconstructing at least one diagnostic image from diagnostic imaging data. A first computational pipeline is defined. The first computational pipeline is divided into a plurality of first execution units. The first execution units are distributed across a symmetric multi-processor system. First diagnostic imaging data is processed using the first execution units. Results of the plurality of first execution units are combined to obtain a first image reconstruction.

According to still yet another aspect of the invention, an apparatus is disclosed for performing diagnostic imaging. The apparatus includes an imaging scanner and a non-volatile memory that receives and stores imaging data produced by the imaging scanner. A plurality of general purpose processors cooperate with a storage medium that stores a computer program to selectively execute the computer program. Execution of the computer program effectuates an image reconstruction method for reconstructing the imaging data produced by the imaging scanner. The reconstruction method includes: defining a plurality of execution units, each execution unit performing a selected reconstruction task; distributing the execution units among the plurality of general purpose processors; and executing the execution units using the general purpose processors to compute the image reconstruction.

One advantage of the present invention resides in better allocation of image processing resources for improved image reconstruction speed.

Another advantage of the present invention resides in improved flexibility in updating, upgrading, and revising imaging facility capabilities.

Another advantage of the present invention resides in improved interconnectedness of resources of an imaging facility within the facility.

Another advantage of the present invention lies in its scalable, modular design such that it is easily mapped to meet a wide range of product performance and cost objectives.

Yet another advantage of the present invention resides in flexibility with respect to hardware. The reconstruction pipeline is constructed from general purpose processors and/or computers rather than dedicated reconstruction hardware. However, the reconstruction pipeline constructed using general-purpose components also can incorporate dedicated hardware if it is available.

Still yet another advantage of the present invention lies in its modular design that encourages incremental development and upgrading of a CT or other type of imaging facility.

Numerous additional advantages and benefits of the present invention will become apparent to those of ordinary skill in the art upon reading the following detailed description of the preferred embodiment.

BRIEF DESCRIPTION OF THE DRAWINGS

The invention may take form in various components and arrangements of components, and in various steps and arrangements of steps. The drawings are only for the purpose of illustrating preferred embodiments and are not to be construed as limiting the invention.

DETAILED DESCRIPTION OF THE PREFERRED EMBODIMENTS

Figure 1:
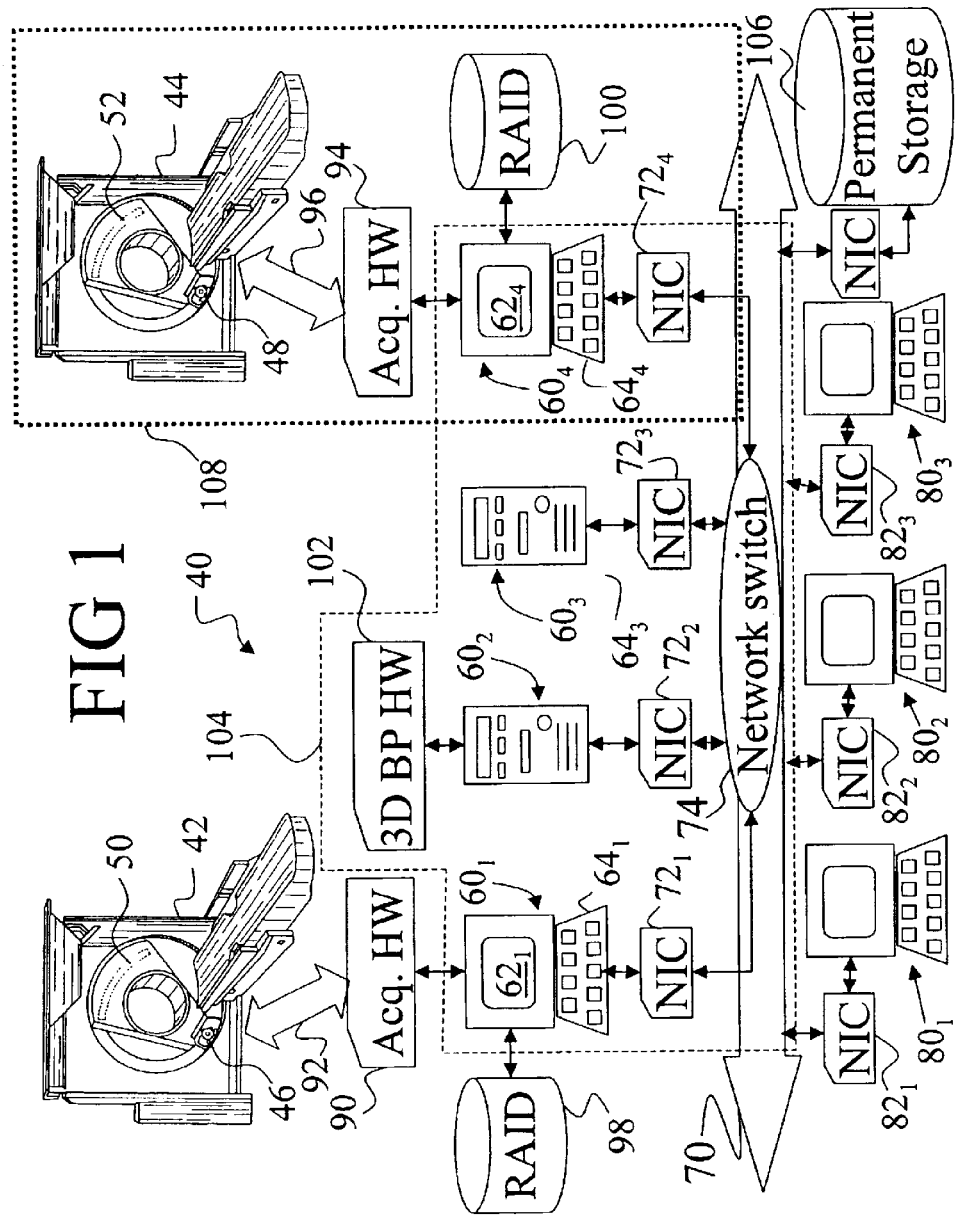
FIG. 1 schematically shows an exemplary computed tomography (CT) imaging facility including two CT imaging scanners, suitably constructed in accordance with one embodiment of the invention.

With reference to FIG. 1, an exemplary computed tomography facility 40 includes two computed tomography (CT) scanner gantries 42, 44, employing x-ray radiation sources 46, 48 and one- or two-dimensional detector arrays 50, 52. Although the two CT imaging scanners 42, 44 shown in FIG. 1 are substantially similar, the imaging scanners can also be of different configurations. One or both scanners 42, 44 can employ a conebeam helical geometry, a multi-slice wedge geometry, or other geometry. Furthermore, the facility 40 is not limited to two scanners 42, 44, but rather can include any number of scanners such as only a single CT scanner, three scanners, four scanners, and so forth.

Those skilled in the art will also recognize that the invention is not limited to computed tomography scanners employing x-ray sources, but rather is also applicable to other imaging scanners such as magnetic resonance imaging (MRI) scanners, positron emission tomography (PET) scanners, single photon emission computed tomography (SPECT) scanners, and the like. The invention is compatible with substantially any diagnostic imaging scanner which produces large amounts of imaging data at high data acquisition rates for reconstruction into image slice representations, three-dimensional image volume representations, maximum intensity projections (MIP's), three-dimensional surface renderings, or other types of image representations. The invention is particularly suitable for applications such as airport security monitoring and medical diagnostic imaging where it is useful to perform image reconstruction rapidly so that the images are available approximately in real-time.

With continuing reference to FIG. 1, the CT imaging facility 40 further includes a plurality of computers 60, in the illustrated embodiment four computers $60_1$, $60_2$, $60_3$, $60_4$. The computers 60 are preferably each general purpose computers, such as personal computers (PC's), workstation computers, or the like. Each computer 60 includes one or more general purpose processors, sometimes referred to in the art as central processing units (CPU's). The computers 60 also include dynamic memory in the form of one or more random access memory (RAM) chips or other dynamic, fast-access storage elements (components not shown).

To achieve rapid reconstruction rates, a plurality of interconnected general purpose processors, for example embodied by a plurality of networked single-processor computers, a single multi-processor computer, or a plurality of networked multi-processor computers, are employed. For example, embodiments have been constructed using a multi-processor computer having two 550 MHz processors or eight 550 MHz processors (for example Pentium® P3-550 processors available from Intel Corporation). An embodiment has also been constructed using a single computer having dual 800 MHz processors (for example Itanium®-800 processors available from Intel Corporation). One preferred embodiment is contemplated to employ two or more computers each operating in the 3 GHz range, each computer including one to three CPU's and about four gigabytes of RAM.

Improved processing performance will typically be obtained by using the most technologically advanced PC's or workstations (e.g., highest CPU speeds, largest number of CPU's in the computer, highest RAM capacity, etc.) available at the time of facility construction. However, such "cutting-edge" computers tend to be expensive. Because the computers $60_1$, $60_2$, $60_3$, $60_4$ are interconnected, computers which are individually less powerful can be used, and improved processing speed obtained by interconnected parallel processing. Preferably, the computers 60 are selected to minimize a cost per FLOPS (floating point operations per second) figure of merit or similar criteria.

The computers $60_1$, $60_4$ shown in FIG. 1 are substantially similar, while the computers $60_2$, $60_3$ are substantially similar to each other but different from the computers $60_1$, $60_4$. Very different computers having different numbers of CPU's, different CPU speeds, different RAM capacities, and so forth can be combined in forming the imaging facility 40.

The computers 60 each include an independent operation system such as a Windows NT, UNIX, LINUX, or MacOS operating system. The various computers $60_1$, $60_2$, $60_3$, $60_4$ can each have a different type of operation system installed. The computers $60_1$, $60_4$ each include user interface devices such as a video monitor $62_1$, $62_4$, a keyboard $64_1$, $64_4$, a mouse (not shown), and the like. The computers $60_2$, $60_3$ do not include user interface devices. Each computer 60 also can include other optional components known to the art, such as a hard disk, an optical compact disk (CD) port, an attached printer, and the like (components not shown).

The computers 60 communicate with a communication network 70 by network interface communication (NIC) cards 72 to form a computer cluster. In FIG. 1 four NIC cards $72_1$, $72_2$, $72_3$, $72_4$ are associated with the four computers $60_1$, $60_2$, $60_3$, $60_4$, respectively. Preferably, a point-to-point network communication protocol is employed in which each computer 60 of the facility 40 is interconnected by a single network switch 74. A suitable embodiment for the network 70 includes a point-to-point Ethernet operating at 100 Mbytes/sec to 1 Gbyte/sec, wherein the network 70 includes the network switch 74. The use of a dedicated network switch 74 for interconnecting the computers 60 beneficially improves speed of the computer cluster and isolates networked processing on the computers 60 from slowdowns due to heavy communication loads on the network 70.

Selection of the fastest (e.g., highest bytes/sec) network and NIC cards available at the time of facility construction will typically improve overall performance. Although NIC cards $72_1$, $72_2$, $72_3$, $72_4$ are shown, it is also to be understood that the network interface communication function can be integrally incorporated into the computer 60. Although the computers $60_2$, $60_3$ do not include user interface devices, an associated user can indirectly access the computers $60_2$, $60_3$ via the network 70.

The networked computers 60, together with the networking hardware 72, 74, collectively form an exemplary embodiment of a symmetric multi-processor system (SMS). The modifier "symmetric" indicates that the various CPU's of the computers 60 are each general purpose processors which are functionally interchangeable. (It should be understood that "functionally interchangeable" as used herein is not equivalent to "functionally similar." For example, a 500 MHz processor and a 1 GHz processor are functionally interchangeable if they can perform the same calculations. However, they are not functionally similar, because, all else being equal, the 1 GHz processor will perform calculations twice as fast as the 500 MHz processor). The SMS can be embodied in various ways, such as a single multi-processor computer or a plurality of networked computers each having one or more processors.

Using a PC or a workstation as at least one of the plurality of computers 60 provides a convenient user interface (e.g., monitor 62, keyboard 64, et cetera) for accessing the SMS. Because the network 70 provides remote access, one computer 60 with such human interface components is sufficient to access all the computers 60. Hence, at least some of the computers 60, such as the computers $60_2$, $60_3$, are optionally not directly associated with a monitor 62, keyboard 64, and other human interfacing components. The computers $60_2$, $60_3$ are accessed remotely and participate in the SMS via the network 70 and included network switch 74 and the NIC cards $72_2$, $72_3$. In one preferred embodiment, the computers $60_2$, $60_3$ do not include conventional "personal computer-type" housings or cases, and are instead mounted on an electronic equipment rack to save space.

In addition to the computers 60 which are included in the SMS of the CT imaging facility 40, the network 70 optionally interconnects other computers 80, such as the exemplary computers $80_1$, $80_2$, $80_3$. The computers 80 include other networked computers not part of the computer cluster formed by the computers 60. For example, the computers 80 can include computers located in an airport security supervisor's office, computers in doctors' offices, general-purpose or clerical computers, and the like. These other computers are optionally connected to the network 70 by network interface communication (NIC) cards 82, e.g. by NIC cards $82_1$, $82_2$, $82_3$, as shown. In this arrangement, the network 70 is typically a wide-area communication network (WAN), such as a building-wide Ethernet of a hospital or clinic. However, these other computers 80 preferably do not connect directly with the network switch 74 of the network 70, but rather connect to the network 70 via other network switches (not shown).

The use of a dedicated network switch 74 in conjunction with a point-to-point network protocol avoids having network traffic generated by other computers 80 slow down the processing of the SMS. It also ensures that separation between each computer 60 and the network switch 74 are within preferred specifications, e.g. less than 100 meters separation. However, the other computers 80 beneficially communicate with the facility 40 via the network 70 to allow doctors or other authorized personnel to remotely access the imaging facility 40 to retrieve images, request alternative image reconstructions, request imaging studies, conduct post-processing image enhancements, and the like.

The CT imaging facility 40 can also benefit from connection with the wider hospital communication network. For example, CT imaging data, image reconstructions, or other CT-related clinical information can be transferred via the hospital communication network to a central electronic patient record storage facility of the hospital. The network 70 optionally also enables access to the Internet. Again, the use of the dedicated network switch 74 prevents Internet-related traffic from slowing down processing on the computer cluster formed by the computers 60.

In another contemplated embodiment (not shown), one of the computers 80 serves as a selected "host" computer for the facility 40. The host computer provides the interface devices (monitor, keyboard, mouse, etc.) for human access to the computer cluster. In this embodiment, all the computers 60 optionally do not include interface devices (monitors 62, keyboards 64, etc.) and instead interface with a human user via the remote host computer. The host computer is preferably not included in the computer cluster formed by the computers 60 and does not directly participate in the reconstruction processing.

Although other computers 80 are shown connected with the network 70 in FIG. 1, it is also contemplated to omit the additional computers 80, so that the facility 40 includes an isolated network of the computers 60 interconnected by the network switch 74. In this embodiment, the network 70 substantially reduces to the network switch 74. In keeping with the modular nature of the invention, such an isolated computing cluster is optionally connected with a hospital network or other selected communication network at a later time by interconnecting the network switch 74 with the selected communication network.

With continuing reference to FIG. 1, each CT imaging scanner 42, 44 is associated with one of the plurality of networked computers 60. In the exemplary embodiment of FIG. 1, the scanner 42 connects with the computer $60_1$ via acquisition hardware 90 and a dedicated communication bus 92, while the scanner 44 connects with the computer $60_4$ via acquisition hardware 94 and a dedicated communication bus 96. The computer $60_1$ manages computed tomography data acquisition from the scanner 42. The computer $60_4$ manages computed tomography data acquisition from the scanner 44.

The acquisition hardware 90, 94 provide real-time processing for the collection of CT projection data. As is known to those skilled in the art, PC's and workstations are typically not real-time computing devices. Early embodiments which included direct control of the CT imaging by a PC experienced intermittent delays of up to a few hundred milliseconds. Thus, in the illustrated embodiment of FIG. 1 dedicated acquisition hardware 90, 94 operates in real-time and includes data buffering to accommodate computing delays. The hardware 90, 94 also include fail-safe modes to accommodate various hardware failures. In existing embodiments, the fail-safe modes effectuate an immediate cessation of output by the affected radiation source 46, 48, and preserve projection data acquired up to the time of the hardware failure. However, other failure modes responsive to particular hardware failures are also contemplated.

Safety regulations applying to radiative medical imaging typically call for imaging data to be recorded on a suitably permanent medium within a specified short time period, such as within about one second after data acquisition. These regulations are intended to limit unnecessary radiation exposure of the subject in the event of a failure in the imaging system. To comply with these regulations, the CT imaging facility of FIG. 1 includes redundant arrays of inexpensive disks (RAID) 98, 100 associated with each data acquisition computer $60_1$, $60_4$. Projection data received by the acquisition computer $60_1$, $60_4$ is transferred immediately to the corresponding RAID 98, 100 non-volatile storage device. Each RAID 98, 100 has a large data transfer bandwidth which enables it to keep up with the typically extremely rapid data acquisition rate of the CT imaging scanners 42, 44.

With continuing reference to FIG. 1, the acquired data is reconstructed using some or all of the networked computers 60. By distributing the reconstruction computations over a plurality of computers, sufficient processing speed is obtained without resort to specialized hardware. However, the reconstruction optionally employs specialized acceleration hardware or other specialized digital signal processing hardware if it is available. Hence, in FIG. 1 an optional backprojector card 102 connected with the computer $60_2$ is detected and employed in the reconstruction. In this case the computer $60_2$ is designated for the backprojecting portion of the reconstruction and receives instructions for effectuating forwarding of projection data to the backprojector card 102 and retrieval of processed data from the backprojector card 102.

The plurality of computers 60 involved in the reconstruction, together with the network elements 70, 72 and any acceleration hardware such as the exemplary backprojector card 102, define a computational pipeline 104 for performing the image reconstruction. The pipeline 104 includes a plurality of execution units, such as computational threads or threaded task groups performing various functions. The execution units, e.g. threads are dynamically distributed across the CPU's of the computers 60 which form the symmetric multi-processor system (SMS). The distribution is dynamic in that the threads are distributed among the processors of the SMS based on the computing capacity of each computer 60 including any associated acceleration hardware 102 as well as on the processing load of each processor.

In a suitable embodiment, the reconstruction pipeline is arranged into a plurality of execution units such as threaded task groups. Each task group is implemented on a processor. Pipe buffers provides a standardized interface between the task groups. The pipe buffers can be separate modules, or can be integrated into functional tasks such as a backprojection task. Each task group is synchronized relative to input and output data, for example by defining several task group states including: a "get ready" state in which the task group initialized; a "ready" state indicating that the task group is ready to receive data; a "reconstruction" state in which the task group is presently processing image data; and a "finish" state indicating that the task group has finished processing.

Those skilled in the art will appreciate that the threaded pipeline approach enables parallel reconstruction processing of imaging data using a plurality of parallel processors. For example, there can be several rebinning task group instances running concurrently on several different processors. Pipe buffer module instances govern transfer of data to and from the concurrent instances of the rebinning task group.

Furthermore, the reconstruction processing is re-allocated or redistributed dynamically responsive to changes in the processing loads. For example, a first reconstruction associated with activity of the first CT imaging scanner 42 is redistributed among the processors of the computers 60 responsive to an additional processing load created by initiation of a second concurrent reconstruction associated with activity of the second CT imaging scanner 44. Further redistribution occurs responsive to processing of a third reconstruction or image enhancement operation initiated by a doctor or analyst via one of the remote computers 80.

The number of concurrently executing reconstructions and other operations is not limited by pipeline architecture defined in hardware, because the reconstructions are dynamically distributed and redistributed across the SMS. Redistribution using the SMS-based pipeline includes creating new task group instances or removing existing task group instances and modifying the threading between the task groups, for example by adding, deleting, and/or reconfiguring the pipe buffer module instances.

The reconstruction pipeline 104 produces one or more image representations, such as a slice image representation, a three-dimensional volume image representation, a maximum intensity projection (MIP), a surface rendering, a series of cine images, or the like. The image representations are optionally stored on a hard disk or other storage media (not shown) associated one of the computers 60. Additionally or alternatively, the image representations are stored on a permanent storage medium 106, such as a hospital records system, which is accessible via the network 70. The permanent storage medium 106 can for example be a magnetic backup tape or disk, or an optical compact disk (CD). The image representations are also optionally remotely accessed by doctors or other analysts using the computers 80 (which can also have storage capability), or transferred off-site via the Internet or another network.

In a suitable embodiment, the image acquisition and reconstruction processing software is embodied on the permanent storage medium 106 that has selected disk space allocated and encoded with the software. In another embodiment, the acquisition and reconstruction processing software is embodied on the computers 60, each of which includes a hard disk or other storage medium with a copy of the processing software encoded thereon. In yet another exemplary embodiment, each computer includes an optical disk port (not shown) and the software is carried by an optical disk (not shown) encoded with the software instructions that are readable by the optical disk port. In still yet another embodiment, the acquisition and reconstruction processing software resides on a network server (not shown) of the network 70. The described acquisition and reconstruction processing software embodiments are exemplary only. Those skilled in the art can select other storage media arranged in other ways respective to the SMS to embody the processing software.

In any of these exemplary embodiments, the appropriate processing software or portions thereof are loaded into the working dynamic (e.g., RAM) memory of the computers 60 forming the SMS facility 40 during system startup or responsive to an initiation of a data acquisition or an image reconstruction. The reconstruction component of the processing software includes instructions or modules for detecting the available reconstruction hardware (e.g., the processors of each of the computers $64_1$, $64_2$, $64_3$, $64_4$, and the backprojector accelerator hardware 102), assessing a usage of each available hardware element, appropriately dividing instructions defining a reconstruction pipeline into a plurality of functionally interconnected processing threads or threaded task groups, distributing the processing threads among the processors of the SMS (taking into account any accessible acceleration hardware 102) and causing the distributed processing threads to execute to process acquired or stored projection data.

The reduction of the distributed processing just described into one or more computer programs written in C, C++, or another programming language, substantially parallels the reduction to software of other known distributed computing applications such as Internet server operations, and so appropriate techniques for reducing to computer program code the detection and assessment of available computing facilities, the dividing of the pipeline into threads or threaded task groups, and distributing of the same across the available computing facilities are known in the art.

It will be appreciated that the distributed computer program modules or elements need not all be written in a single programming language. Furthermore, multi-processor computers typically include appropriate firmware for distributing threaded computational tasks across the CPU's. This existing firmware is preferably utilized in implementing the distribution of threaded task groups within he multiprocessor computer.

The facility 40 is modular. Selected components can be added and subtracted within certain limits while retaining acquisition and reconstruction functionality. For example, the system could originally have been constructed without the components particularly associated with the second scanner 44. These components, including the scanner 44, associated acquisition computer $60_4$ and its NIC card $72_4$, the acquisition hardware 94 and communication bus 96, and the RAID 100, are designated by the dotted outline 108 in FIG. 1. In an incremental construction of the CT facility 40, an initial system without the components 108 would include only a single CT imaging scanner 42 and three computers $60_1$, $60_2$, $60_3$. A presently existing embodiment employing three computers each having dual Pentium® P-4 2.2 GHz processors (available from Intel Corporation) reconstructs about 50 typical CT image slices per second.

When the hospital or clinic later acquires the second CT imaging scanner 44 and the related components collectively identified by the dotted outline 108, these components are fully integrated into the previously existing single-scanner facility to form the two-scanner facility 40 illustrated in FIG. 1. In presently existing embodiments using existing PC computers, it has been found that each additional computer added to the processing pipeline 104 adds about 17 images per second to the computation speed. Hence, in addition to improving data acquisition throughput by adding the modular components 108 including the second scanner 44, the modular addition 108 also increases the reconstruction speed of first scanner data whenever the second scanner is not performing a reconstruction. Similarly, the new scanner 44 gains the benefit of the previously existing computational framework including computers $60_1$, $60_2$, $60_3$ for processing its images. A third, fourth, fifth, etc. scanner can be similarly modularly added to the facility 40 shown in FIG. 1. The facility 40 could also be improved while retaining the two-scanner arrangement by adding additional computers or by upgrading the existing computers to faster machines possibly including additional processors.

Those skilled in the art will recognize that the reconstruction speeds given here, i.e. about 50 images per second using three computers and about 67 images per second using four computers, are exemplary only. Large variations in the reconstruction speeds actually achieved will be dependent upon the type and speed of computers, number of processors per computer, addition of acceleration hardware, and similar factors.

Figure 2:
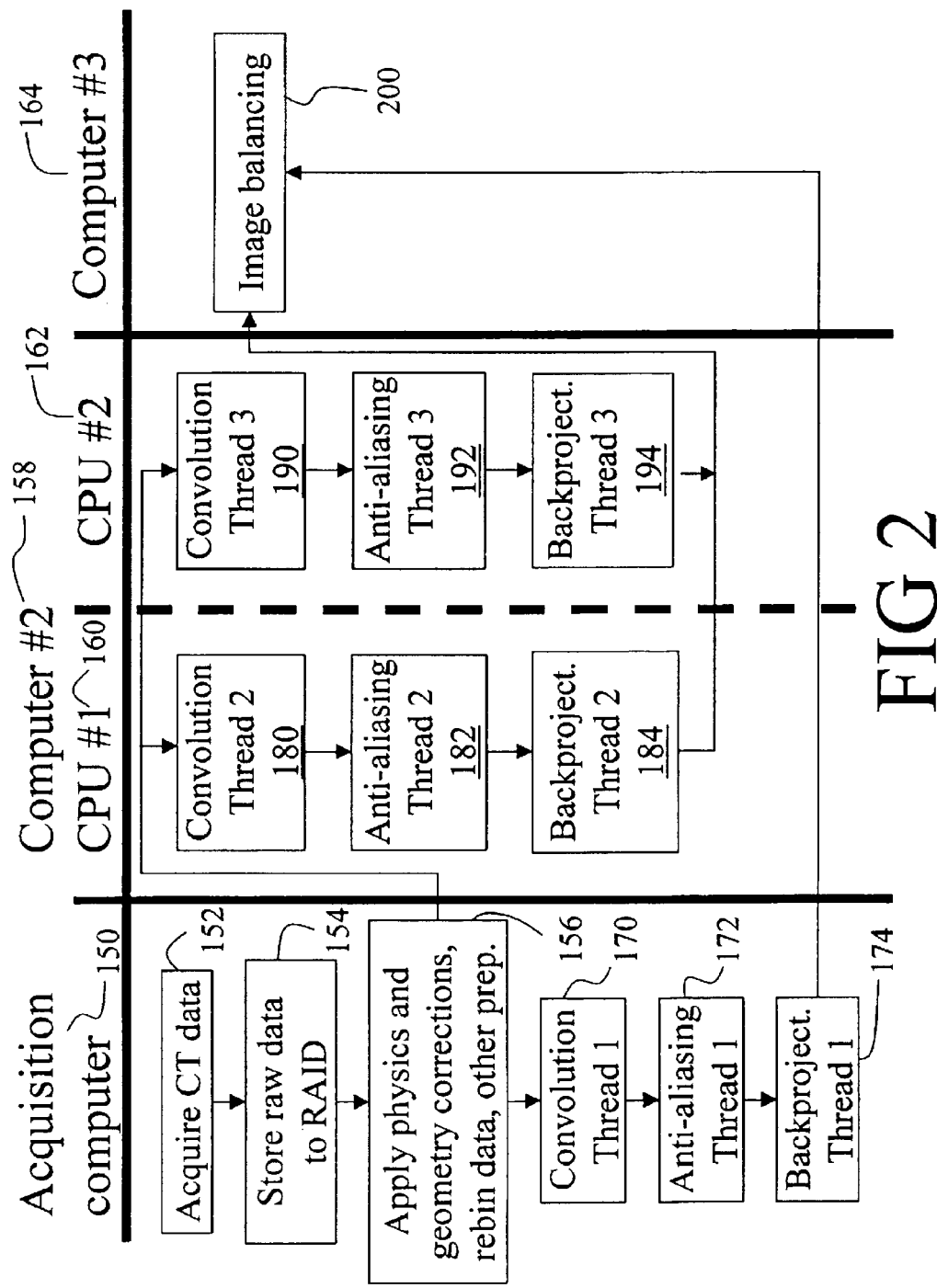
FIG. 2 schematically shows allocation of image acquisition and reconstruction across three computers in accordance with an embodiment of the invention.

With reference to FIG. 2, an exemplary processing pipeline for a single reconstruction process using three computers and no acceleration hardware is described. An acquisition computer 150 cooperates with a CT imaging scanner (not shown in FIG. 2) in acquiring 152 projection data. The raw data is preferably written 154 to RAID storage as soon as possible, e.g. within about one second to comply with medical imaging safety regulations. The raw data is pre-processed 156. The pre-processing 156 includes physics corrections that correct for artifacts introduced in the data collecting 152, geometry corrections that correct for machine geometry artifacts, angular data rebinning, data sorting, and the like.

The pre-processed projection data is reconstructed using a computational pipeline which is distributed among the acquisition computer 150, a second computer designated "Computer #2", which has two CPUs labeled "CPU #1" 160 and "CPU #2" 162, and a third computer designated "Computer #3" 164. The convolving, anti-aliasing, and back-projecting portion of the pipeline is divided into three execution units, in the exemplary embodiment computational threads. A first thread includes a threaded task group executed on the acquisition computer 150: "Convolution Thread 1" 170; "Anti-aliasing Thread 1" 172; and "Back-projection thread 1" 174. A second thread includes a threaded task group executed on the first CPU #1 160 of Computer #2 158: "Convolution Thread 2" 180; "Anti-aliasing Thread 2" 182; and "Backprojection thread 2" 184. A third thread includes a threaded task group executed on the second CPU #2 162 of Computer #2 158: "Convolution Thread 3" 190; "Anti-aliasing Thread 3", 192; and "Back-projection thread 3" 194. Computer #3 164 performs an image balancing task 200.

It will be recognized that each of the four processors 150, 160, 162, 164 execute their tasks substantially independently and concurrently, so that processing speed is increased. Some delays can be introduced due to data bottlenecks, however. For example, the image balancing 200 performed on Computer #3 164 can be delayed if the convolving/backprojecting threads running on the acquisition computer 150 and Computer #2 158 are delayed. However, the parallel processing of threads significantly improves processing speed in the vast majority of cases, especially if the threads are distributed across the computers 150, 158, 164 to substantially balance the processing loads.

In a preferred embodiment, the reconstruction processing software identifies the available computers 150, 158, 164 and the capacities of each computer (e.g., the dual processor configuration of Computer #2 158, and distributes the processing tasks accordingly. Computer #2 158 includes integrated firmware for distributing threads and other computational tasks among its two CPUs 160, 162, and so the reconstruction processing software preferably takes advantage of this existing firmware.

Figure 3:
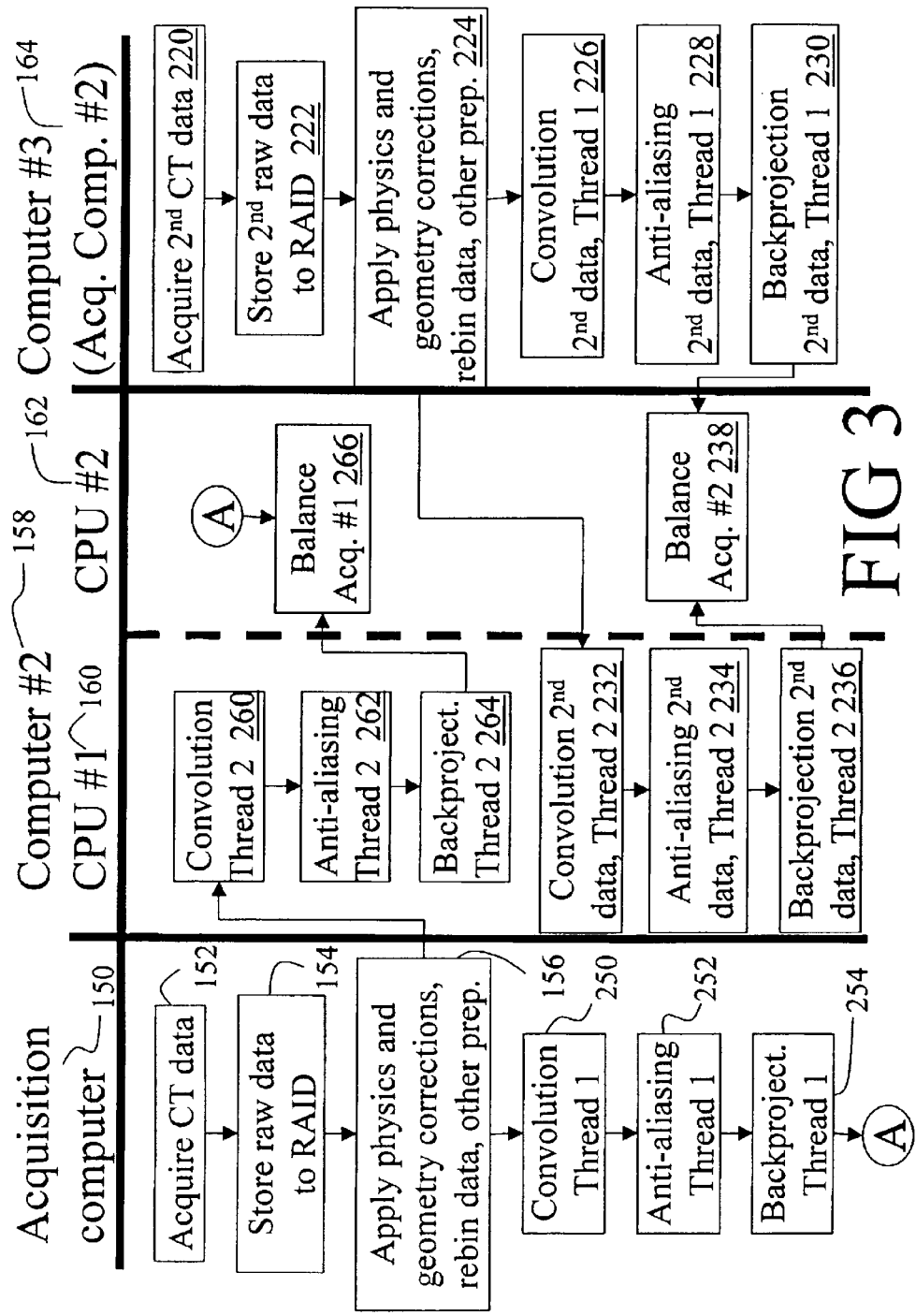
FIG. 3 schematically shows redistribution of the reconstruction of FIG. 2 responsive to the initiation of an imaging session using a second connected CT scanner.

With reference to FIG. 3, the computational pipeline reconstructing image data acquired 152 by the first CT scanner (not shown in FIG. 3) is preferably dynamically redistributed among the computers 150, 158, 164 responsive to a change in processing load. In the exemplary embodiment of FIG. 3, Computer #3 serves as a second acquisition computer #2 for a second CT scanner (not shown in FIG. 3). FIG. 3 illustrates an exemplary redistributed computational load formed responsive to initiation of data acquisition using the second CT scanner.

Computer #3 164, serving as acquisition computer #2, cooperates with the second CT scanner in performing 220 the second projection data acquisition. This second data is preferably written 222 to RAID storage as soon as possible, e.g. within about one second to comply with medical imaging safety regulations. The second raw data is pre-processed 224. The pre-processing 224 can include physics corrections that correct for artifacts introduced in the data collecting 220, geometry corrections that correct for machine geometry artifacts, angular data rebinning, data sorting, and the like.

It will be appreciated that the second data acquisition 220 is unrelated to the original data acquisition 152. For example, the first data acquisition 152 can be a cardiac spiral CT imaging series, while the second data acquisition 220 can be multi-slice brain scan. It is even contemplated to integrate different scanner types, such as a CT scanner and an MRI scanner, into a single diagnostic imaging facility.

The pre-processed second projection data is reconstructed using a second computational pipeline which is distributed among Computer #3 164 and the two processors 160, 162 of Computer #2 158. The convolving, anti-aliasing, and back-projecting portions of the second pipeline are divided into two threads. A first thread of the exemplary second reconstruction pipeline is executed on the second acquisition computer, i.e. on Computer #3 164, and includes the task group: "Convolution ($2^{nd}$ data) Thread 1" 226; "Anti-aliasing ($2^{nd}$ data) Thread 1" 228; and "Backprojection ($2^{nd}$ data) thread 1" 230. A second thread is performed on the first CPU #1 160 of Computer #2 158 and includes the task group: "Convolution ($2^{nd}$ data) Thread 2" 232; "Anti-aliasing ($2^{nd}$ data) Thread 2" 234; and "Backprojection ($2^{nd}$ data) thread 2" 236. The second CPU 162 of Computer #2 158 performs an image balancing for the second data image reconstruction as a task 238.

Due to the increased processing load resulting from initiation of the second data acquisition and reconstruction, the first pipeline (including tasks 170, 172, 174, 180, 182, 184, 190, 192, 194 of FIG. 2) is redistributed as shown in FIG. 3. A first thread executed on the acquisition computer 150 includes the tasks: "Convolution Thread 1" 250; "Anti-aliasing Thread 1" 252; and "Backprojection thread 1" 254. A second thread executed on the first CPU #1 160 of Computer #2 158 includes the tasks: "Convolution Thread 2" 260; "Anti-aliasing Thread 2" 262; and "Backprojection thread 2" 264. An image balancing task 266 is performed on the second CPU 162 of Computer #2 158.

It will be recognized that in the redistribution of the first reconstruction pipeline responsive to the additional load, the number of concurrently running convolution/anti-aliasing/backprojection threads is reduced from three in FIG. 2 to two in FIG. 3. This will typically result in a slower throughput for the first reconstruction pipeline. However, the SMS including the acquisition computer 150, CPU #1 160, CPU #2 162, and Computer #3 164 is performing two concurrently running reconstruction instances in FIG. 3 versus only one reconstruction instance in FIG. 2, and the redistribution optimizes processing on the SMS for the two concurrent reconstructions. The processing software can similarly redistribute the processing load to accommodate additional reconstruction pipelines, such as an additional pipeline initiated by a medical analyst that performs a specialized reconstruction of previously acquired data.

Figure 4:
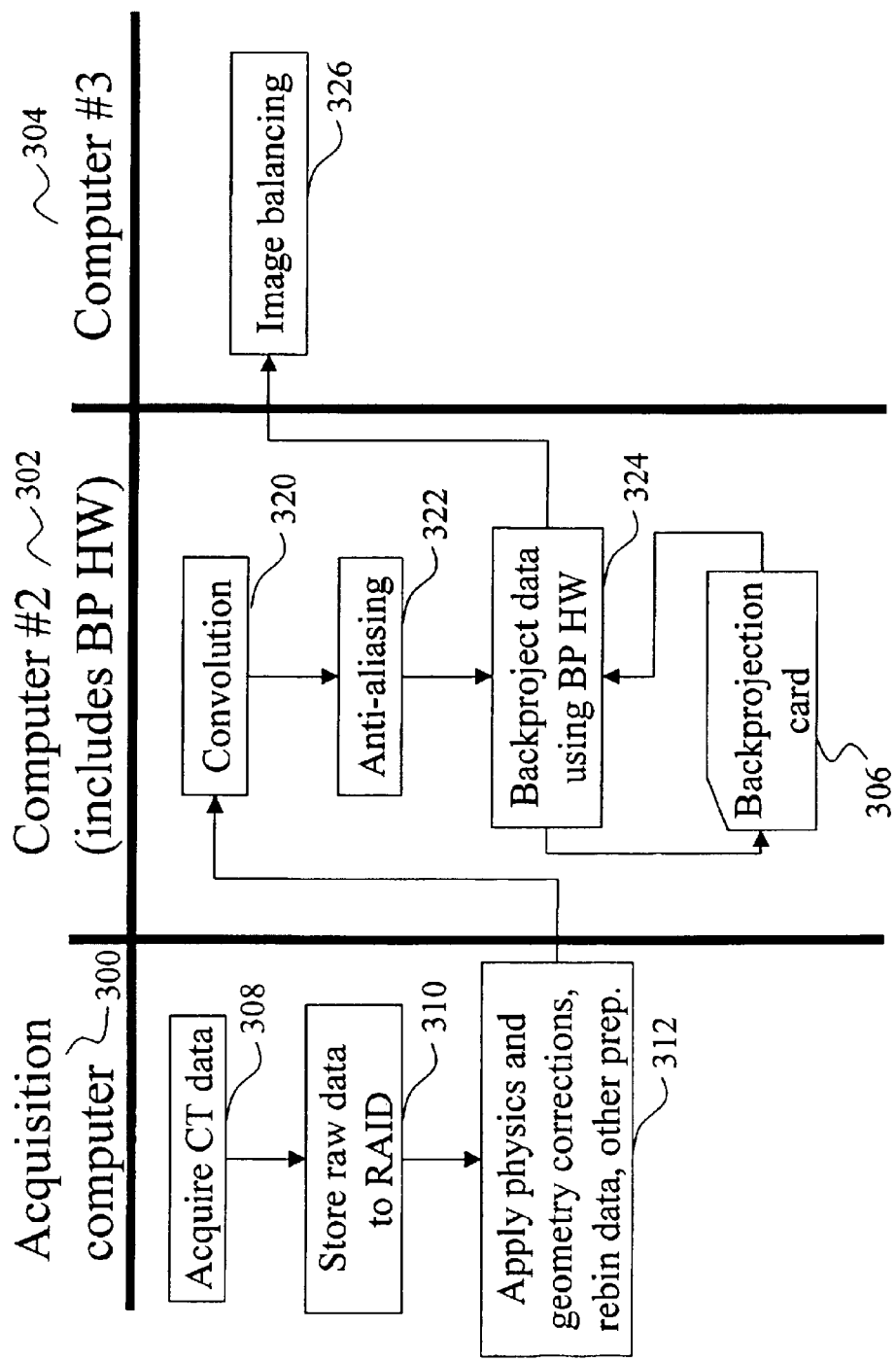
FIG. 4 schematically shows allocation of image acquisition and reconstruction across three computers, one of which includes a backprojection card, in accordance with another embodiment of the invention.

With reference to FIG. 4, a CT image acquisition and reconstruction employing three computers and backprojection acceleration hardware is described. The SMS includes three single-processor computers: an acquisition computer 300, a second computer designated "Computer #2" 302, and a third computer designated "Computer #3" 304. Computer #2 302 has a backprojector card 306 connected therewith.

The acquisition computer 300 cooperates with a CT scanner (not shown in FIG. 4) to acquire CT data 308, which is rapidly stored 310 to a RAID storage in accordance with applicable safety regulations. Appropriate data corrections, such as physics and geometrical corrections, are applied 312.

A reconstruction pipeline is distributed onto Computer #2 302 and Computer #3 304. The reconstruction processing software detects the backprojector card 306. Because the acceleration hardware 306 improves the backprojection speed, the reconstruction software allocates only a single convolution/anti-aliasing/backprojecting thread including a convolution task 320, an anti-aliasing task 322, and a backprojection task 324 on Computer #2 302, along with an image balancing task 326 on Computer #3 304. The backprojection task 324 preferably does not directly perform the backprojecting. Rather, it serves as an interface unit that formats received projection data to conform with input requirements of the backprojection card 306, communicates the formatted projection data to the backprojection card 306, and retrieves the backprojected data therefrom.

The embodiment of FIG. 4 is exemplary only. Other types of digital signal processing hardware can be similarly incorporated into the distributed pipeline using appropriate task group components that format and communicate input data to the specialized hardware and receive processed data therefrom.

In addition to acquisition and processor is modularity previously discussed with reference to FIG. 1 (e.g., optional addition or upgrading of CT scanners or processing computers), it will be appreciated that the use of a distributed reconstruction processing pipeline on an SMS facilitates modularity of reconstruction processing capabilities as well. The addition of new reconstruction algorithms, new data pre-processing steps, and the like is readily accomplished using software upgrades. As is known to the art, software upgrades are typically simpler and more cost effective than hardware upgrades. Mixed hardware/software upgrades are also facilitated. For example, in the exemplary embodiment of FIG. 4, upgrading the backprojection card 306 includes merely replacing the card 306 with the new backprojection card and installing a software upgrade which updates the backprojecting driver thread 324. The development of new or upgraded reconstruction processing capabilities is similarly simplified.

Those skilled in the art will recognize that invention is not limited to CT imaging facilities. Other types of security and diagnostic imaging employing magnetic resonance imaging (MRI) scanners, positron emission tomography (PET) scanners, and the like, will similarly benefit. The invention is also not limited to backprojection reconstruction techniques. Other reconstruction methods, such as the inverse FFT transform methods commonly used in conjunction with MRI data, can be similarly implemented as a distributed software pipeline running on a plurality of general purpose processors.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A CT imaging apparatus comprising:
   a first CT gantry that acquires projection data;
   first dedicated data acquisition electronics communicating with the first CT gantry;
   a first acquisition computer that receives projection data from the first data acquisition electronics;
   a communication network communicating with the first acquisition computer;
   at least one additional computer communicating with the communication network, the at least one additional computer cooperating with the first data acquisition computer and the communication network to define a computational pipeline to perform reconstruction operations on the projection data received by the first acquisition computer; and
   a program storage medium storing a software program that is selectively distributed on the first acquisition computer and on the at least one additional computer to define the computational pipeline, the software program including instructions for redistributing the computational pipeline among the first acquisition computer and the at least one additional computer during reconstruction of the projection data responsive to a change in a computational load.

2. The CT imaging apparatus as set forth in claim 1, wherein at least one of the first acquisition computer and the at least one additional computer includes:
   a plurality of central processing units and the pipeline includes a plurality of threads each arranged on one of the central processing units.

3. The CT imaging apparatus as set forth in claim 1, wherein the communication network includes a network switch interconnecting the first acquisition computer and the at least one additional computer.

4. A CT imaging apparatus comprising:
   a first CT gantry that acquires projection data;
   first dedicated data acquisition electronics communicating with the first CT gantry;
   a first acquisition computer that receives projection data from the first data acquisition electronics:
   a communication network communicating with the first acquisition computer;
   at least one additional computer communicating with the communication network, the at least one additional computer cooperating with the first data acquisition computer and the communication network to define a computational pipeline to perform reconstruction operations on the projection data received by the first acquisition computer;
   a second CT gantry that acquires second projection data;
   second dedicated data acquisition electronics communicating with the second CT gantry; and
   a second acquisition computer that receives projection data from the second data acquisition electronics, the second acquisition computer communicating with the communication network.

5. The CT imaging apparatus as set forth in claim 4, wherein at least one of the at least one additional computer receives the second projection data from the second data acquisition computer and the network to define a second computational pipeline to perform reconstruction operations on the second projection data received by the second acquisition computer.

6. A modular system for reconstructing diagnostic images, the system comprising:
   a high speed communications bus;
   a plurality of processing PC's connected with the bus;
   a first gantry for acquiring electronic data indicative of an internal region of a subject;

a first acquisition PC connected to the first gantry and the bus and programmed to (1) control the first gantry, (2) acquire the electronic data from the first gantry, (3) perform limited processing of the electronic data, (4) distribute at least some of the electronic data to processing PC's, and (5) communicate with the processing PC's to cooperatively perform reconstruction operations on the data to generate image representations;

a first non-volatile memory connected with the first acquisition PC for storing the electronic data from the first gantry;

a second gantry for acquiring electronic data indicative of an internal region of a subject;

a second acquisition PC connected to the second gantry and the bus and programmed to (1) control the second gantry, (2) acquire the electronic data from the second gantry, (3) perform limited processing of the electronic data, (4) distribute at least some of the electronic data to the processing PC's, and (5) communicate with the processing PC's to cooperatively perform reconstruction operations on the data to generate image representations;

a second non-volatile memory connected with the second acquisition PC for storing the electronic data from the second gantry; and at least one display terminal for converting electronic image representations reconstructed from the electronic data from the first and second gantries into a human viewable display.

7. The modular system as set forth in claim 6, wherein each of the acquisition PC's and the plurality of processing PC's includes:

a network interface card to interface the PC with the communication bus.

8. The modular system as set forth in claim 6, further including:

at least one backprojection card mounted in at least one of the processing PC's.

9. The modular system as set forth in claim 6, wherein the high speed communication bus includes:

a network switch connecting the first and second acquisition PC's and the processing PC's, the network switch further connecting with a point-to-point hospital communication network that includes an electronic patient record storage facility.

10. The modular system as set forth in claim 9, further including:

a host PC connected with the hospital communication network and programmed to remotely control the first and second acquisition PC's and the processing PC's, the host PC receiving the image reconstructions and performing image enhancement operations; and a monitor connected with the host PC for converting enhanced electronic image representations into a human viewable display.

11. The modular system as set forth in claim 6, wherein the first and second gantries each include one of: a CT gantry, a MRI gantry, a PET camera, and a SPECT camera.

12. The modular system for reconstructing diagnostic images as set forth in claim 6, wherein the first acquisition PC comprises a multi-processor computing device.

13. The modular system for reconstructing diagnostic images as set forth in claim 6, wherein the second acquisition PC comprises a multi-processor computing device.

14. The modular system reconstructing diagnostic images as set forth in claim 6, wherein at least one of the processing PC's comprises a multi-processor computing device.

15. The modular system for reconstructing diagnostic images as set forth in claim 6, further comprising accelerator hardware operatively connected to the processing PC's.

* * * * *